US012276157B2

(12) United States Patent
Benotto

(10) Patent No.: US 12,276,157 B2
(45) Date of Patent: Apr. 15, 2025

(54) CONDENSATION WATER DISPOSAL DEVICE OF A RAPID SLIDING ROLL-UP DOOR INTERPOSED BETWEEN TWO ENVIRONMENTS WITH DIFFERENT TEMPERATURES

(71) Applicant: BMPEUROPE S.r.l., Villanova d'Asti (IT)

(72) Inventor: Danilo Benotto, Montá (IT)

(73) Assignee: BMPEUROPE S.R.L. (IT)

( * ) Notice: Subject to any disclaimer, the term of this patent is extended or adjusted under 35 U.S.C. 154(b) by 225 days.

(21) Appl. No.: 17/987,430

(22) Filed: Nov. 15, 2022

(65) Prior Publication Data

US 2023/0167677 A1 Jun. 1, 2023

(30) Foreign Application Priority Data

Nov. 26, 2021 (IT) ........................ 102021000030011

(51) Int. Cl.
*E06B 9/17* (2006.01)
*E06B 9/58* (2006.01)

(52) U.S. Cl.
CPC ............ *E06B 9/17007* (2013.01); *E06B 9/58* (2013.01)

(58) Field of Classification Search
CPC .......... E06B 9/56; E06B 9/58; E06B 9/11-17; E06B 9/17007; E06B 9/17015;
(Continued)

(56) References Cited

U.S. PATENT DOCUMENTS 3,292,685 A * 12/1966 Clark ........................ E06B 9/58 160/264
3,734,161 A * 5/1973 Pierce ....................... E06B 9/60 160/40
(Continued)

FOREIGN PATENT DOCUMENTS

DE 202009011324 1/2010 ............... E06B 7/28
FR 3046685 7/2017 ............. G05B 15/02

OTHER PUBLICATIONS

Search Report issued in related Italian Patent Application Serial No. IT202100030011, dated Jul. 6, 2022, 2 pgs.
(Continued)

*Primary Examiner* — Johnnie A. Shablack
(74) *Attorney, Agent, or Firm* — HAYES SOLOWAY P.C.

(57) ABSTRACT

A high speed sliding roll-up door interposed between two rooms at different temperatures has a flexible curtain to close or open a passage of a wall separating these rooms. The roll-up door has two side uprights having guide rails of the side edges of the curtain, and an upper crosspiece near which there is a storage area of the curtain. A device for draining the condensation water present on the curtain includes guide rails having an upper rectilinear portion, close to the shelter area, and a lower rectilinear portion offset with respect to the upper rectilinear portion, between which an inclined portion is interposed which is connected upstream and downstream with the upper and lower rectilinear portion. Below the upper rectilinear portion there is a gutter formation configured to receive the condensation water present on the curtain, when this rises towards the shelter area.

8 Claims, 2 Drawing Sheets

(58) Field of Classification Search
CPC ............... E06B 9/17023; E06B 9/1703; E06B 9/17076; E06B 9/17061; E06B 2009/587; E06B 2009/588; E06B 2009/1566; E06B 2009/17084
See application file for complete search history.

(56) References Cited

U.S. PATENT DOCUMENTS

| | | | | | |
|---|---|---|---|---|---|
| 3,840,061 | A * | 10/1974 | Herms | E06B 9/76 | 160/133 |
| 4,018,259 | A * | 4/1977 | Herms | E06B 9/68 | 160/133 |
| 4,524,814 | A * | 6/1985 | Deziel | E06B 9/11 | 160/84.01 |
| 5,027,494 | A | 7/1991 | Martin | E04F 21/0007 | |
| 5,161,593 | A * | 11/1992 | Hirabayashi | E06B 9/1703 | 160/310 |
| 5,484,007 | A * | 1/1996 | Rejc | E06B 9/0638 | 160/133 |
| 5,488,982 | A * | 2/1996 | Rejc | E06B 9/15 | 160/310 |
| 5,862,851 | A * | 1/1999 | Stoebich | E06B 9/58 | 160/246 |
| 6,247,517 | B1 * | 6/2001 | Drifka | E06B 9/58 | 160/44 |
| 7,464,743 | B1 | 12/2008 | Berger | E06B 9/581 | |
| 8,272,425 | B2 * | 9/2012 | Coenraets | E06B 9/58 | 160/133 |
| 8,302,353 | B2 * | 11/2012 | Bren | E04B 1/66 | 52/204.55 |
| 9,022,089 | B1 * | 5/2015 | Dau | E06B 9/54 | 160/30 |
| 9,428,955 | B2 * | 8/2016 | Fleischman | E04F 10/0607 | |
| 9,957,749 | B2 * | 5/2018 | Frede | E06B 9/15 | |
| 10,526,838 | B2 | 1/2020 | Chang et al. | E06B 7/14 | |
| 10,851,544 | B1 * | 12/2020 | Volin | E04B 7/16 | |
| 11,725,453 | B2 | 8/2023 | Koshar | E06B 7/18 | |
| 12,006,764 | B2 * | 6/2024 | Benotto | E06B 9/17076 | |
| 2003/0213180 | A1 * | 11/2003 | Ueda | E06B 9/17076 | 49/489.1 |
| 2009/0008039 | A1 | 1/2009 | Lambridis | E06B 3/80 | |
| 2009/0178344 | A1 | 7/2009 | Salerno | E06B 7/16 | |
| 2011/0283620 | A1 | 11/2011 | Drifka | E06B 9/13 | |
| 2012/0145337 | A1 | 6/2012 | Mortier | E05D 15/242 | |
| 2015/0096696 | A1 | 4/2015 | Sentjurc | E06B 9/13 | |
| 2016/0032646 | A1 * | 2/2016 | Fleischman | E06B 9/68 | 16/96 R |
| 2017/0218699 | A1 | 8/2017 | Mugnier | E06B 9/88 | |
| 2018/0119482 | A1 | 5/2018 | Chang | E06B 9/11 | |
| 2021/0032928 | A1 | 2/2021 | Koshar | E06B 7/20 | |
| 2021/0148166 | A1 | 5/2021 | Fischer | E06B 9/582 | |
| 2022/0136321 | A1 | 5/2022 | Hoezee | E06B 3/70 | |
| 2022/0154527 | A1 * | 5/2022 | Benotto | E06B 9/17023 | |
| 2023/0167673 | A1 * | 6/2023 | Benotto | E06B 9/15 | 49/304 |

OTHER PUBLICATIONS

Office Action issued in related U.S. Appl. No. 17/987,455, dated Nov. 17, 2023, 10 pgs.

* cited by examiner

CONDENSATION WATER DISPOSAL DEVICE OF A RAPID SLIDING ROLL-UP DOOR INTERPOSED BETWEEN TWO ENVIRONMENTS WITH DIFFERENT TEMPERATURES

FIELD OF THE INVENTION

The present invention refers in general to a high speed sliding roll-up doors for industrial use, which comprise a flexible curtain which, in the open condition of the door, is intended to be received in a shelter area placed above a portal structure which delimits a passage formed in a wall separating two adjacent rooms isolated by the door.

BACKGROUND OF THE INVENTION

FIGS. 1 to 3 of the attached drawings show a roll-up door for industrial use according to the known prior art, indicated 10 as a whole. The roll-up door 10, of the so-called "high speed sliding" type, allows to close or open a passage 12 formed in a wall 14 by means of a flexible curtain 16 typically made of a plastic material or of a plasticized textile material. The aforementioned passage 12, which extends vertically between an upper crosspiece 20 and a lower base plane 22, or floor, as well as laterally between a pair of opposite vertical uprights 24 provided with respective straight and vertical guide rails 26 intended to be engaged slidably by the side edges of the curtain 16, allows two rooms to communicate upstream and downstream, respectively, of a portal structure 18 which delimits the passage 12.

Above the portal structure 18 there is a shelter area for the curtain 16, indicated by the reference number 28, delimited by a box-shaped cover casing 30, commonly called "roller shutter box", in which the curtain 16 is stored in the its wrapped configuration, when the door 10 is in its open condition. For this purpose, in the shelter area 28 there is a rotatably mounted motorized winding shaft 32 parallel to the upper crossbar 20 of the structure 18, on which the curtain 16 is wound during its raising in the opening step of the roll-up door 10.

Often, a roll-up door 10 of the type described above is used to close a room downstream the portal structure 18, in which a predetermined temperature significantly lower than the temperature of the room upstream of the portal structure 18, i.e. of the outer environment, as in the case of a cold room, in which the used curtain 16 may have a thermal insulation cavity.

A roll-up door 10 of this type is frequently subject to the formation of a layer of moisture consisting of micro-droplets of water or a film of liquid on the surface of the curtain 16 facing the outer environment with a higher temperature, as a result of the condensation of the water vapor present in the air of this environment.

The condensation water existing on the vertical portion of the curtain 16 flows by gravity towards the lower transversal edge of the curtain 16, when the latter rises and is wrapped up in the shelter area 28, causing an annoying fall of water on the floor below the roller shutter box 30 at the portal structure 18.

SUMMARY OF THE INVENTION

More particularly, the invention relates to a device for draining condensation water from a high speed sliding roll-up door interposed between two environments at different temperatures, of the type defined in the preamble of the attached claim 1.

The object of the invention is to propose a simple and reliable device which allows to avoid the fall of the condensation water from the curtain towards the floor.

In particular, according to the invention, the guide rails of the curtain comprise an upper rectilinear portion close to said shelter area, and a lower rectilinear portion offset with respect to the upper rectilinear portion, between which an S-shaped inclined portion is interposed, which is connected upstream and downstream with said upper and lower rectilinear portions by means of respective curved sections, a gutter formation being arranged below said upper rectilinear portion to receive by gravity the condensation water coming from the surface of said curtain during its raising step towards said shelter area. By virtue of these features, it is possible to almost completely eliminate the fallout of condensation water from the curtain of the roll-up closure to the floor, below the roller shutter box for sheltering the curtain.

According to a preferred feature of the invention, the inclined portion is inclined with respect to said upper and lower rectilinear portions by an angle between about 20° and 40°, preferably about 30°.

In this manner, the uprights of the portal structure can be made with a thickness only slightly greater than the thickness of the uprights of the traditional roll-up doors, so that the invention can be easily applied to roll-up doors which initially have the traditional structure, with just a few modifications within the reach of a skilled operator, during a periodic maintenance operation.

According to another preferred feature of the invention, the gutter formation consists of a substantially horizontal hollow section bar having a concavity facing upwards, the length of which is at least equal to the width of said curtain. This makes it possible to keep simple the structure of the gutter formation, and therefore of the entire condensation water draining device of the roll-up door.

Preferably, and according to yet another preferred feature of the invention, the center of the concavity of the section bar of the gutter formation is positioned substantially on the vertical axis of said upper rectilinear portion of said guide rails of the curtain. In this manner, the best operating efficiency of the condensation water draining device of the invention is obtained.

BRIEF DESCRIPTION OF THE DRAWINGS

Further characteristics and advantages of the invention will become clearer from the following detailed description, provided by way of non-limiting example and referred to the attached drawings in which.

DETAILED DESCRIPTION OF THE INVENTION

Figure 1:
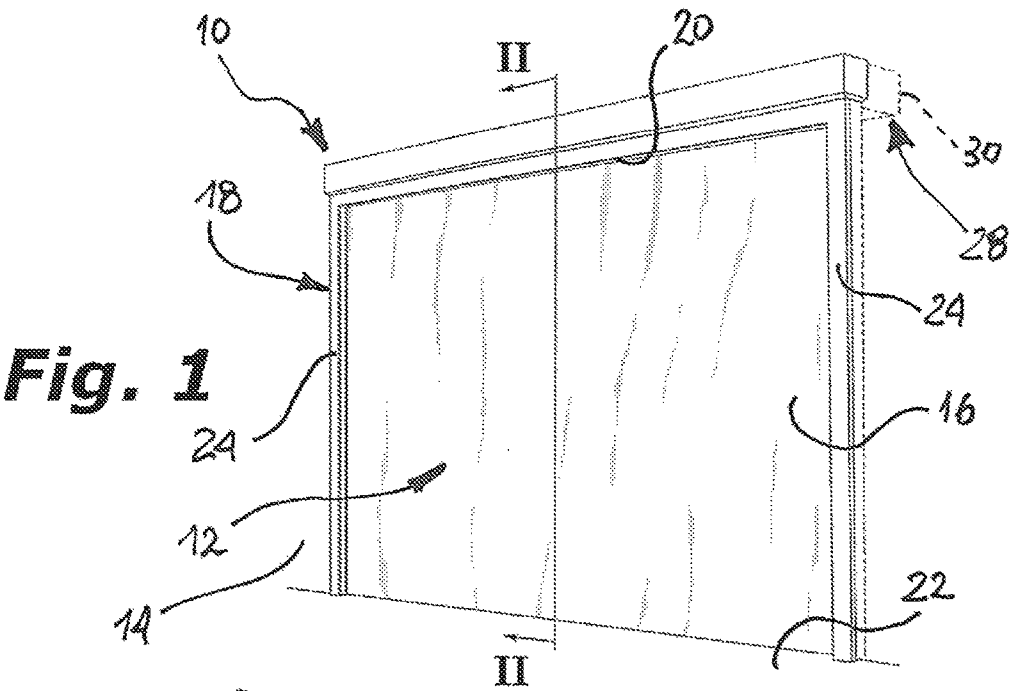
FIG. 1 is a schematic perspective view of a roll-up door according to the prior art with its curtain in the completely lowered condition in which it closes a passage delimited by a portal structure associated with a wall separating two rooms at different temperatures.
Figure 2:
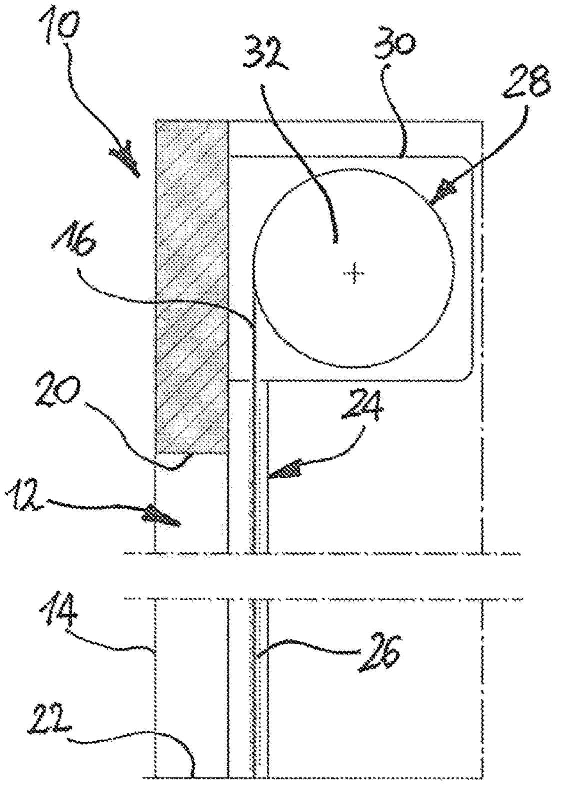
Fig. 2 (prior art)
FIG. 2 is a schematic side elevation view of the door of FIG. 1 from the side of line II-II, in which the surface of the curtain facing the outer environment has a layer of condensation water.
Figure 3:
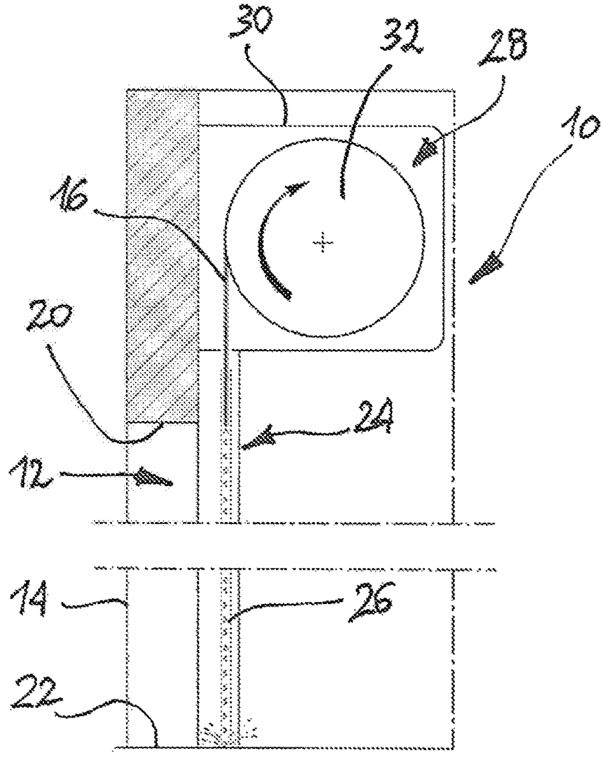
Fig. 3 (prior art)
FIG. 3 is a view similar to FIG. 2 showing the related roll-up door with its curtain in the raised condition at the end of the raising step of the curtain and its rolling up in the shelter area.
Figure 5:
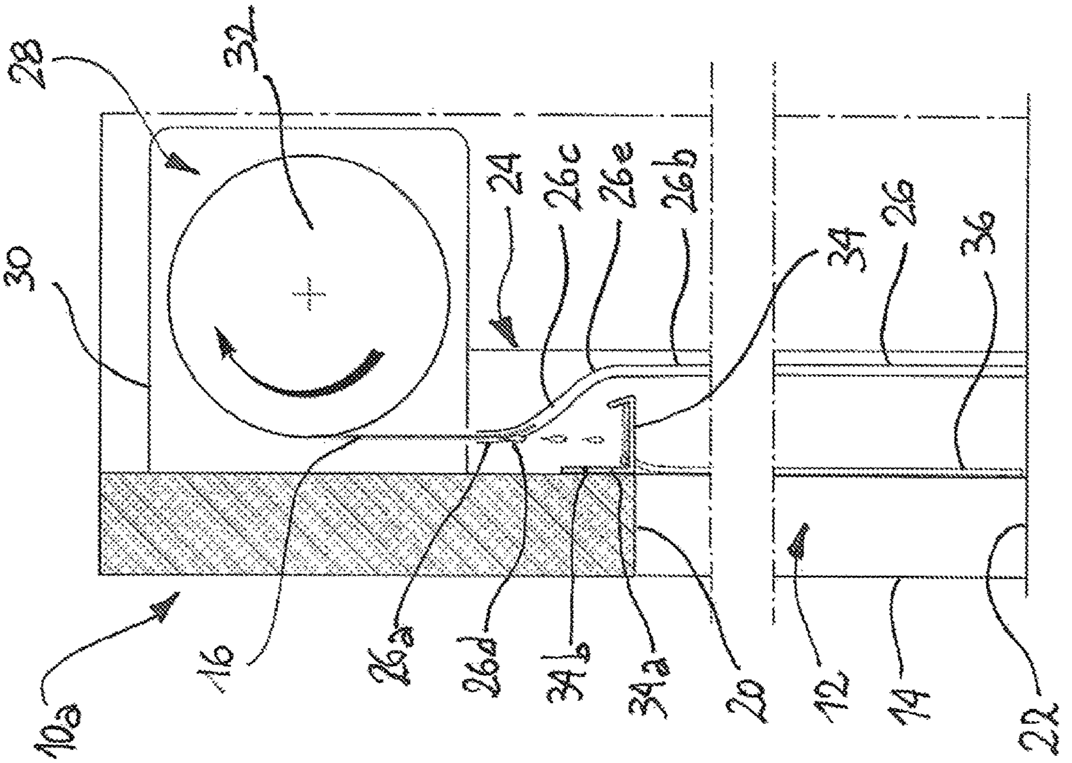
FIG. 5 is a view similar to that of FIG. 3, of a roll-up door provided with the device of the invention, with its curtain in the fully raised condition.
Figure 4:
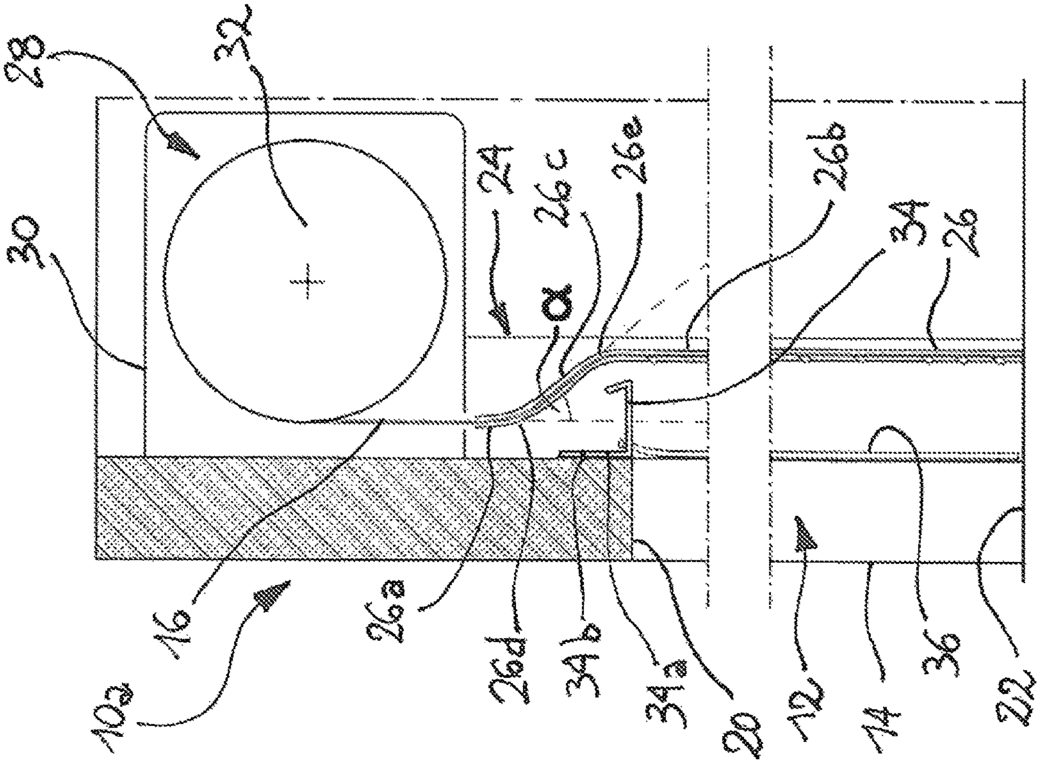
FIG. 4 is a view similar to that of FIG. 2, showing a roll-up door provided with the device of the invention with its curtain in the fully lowered condition.

In FIGS. 4 and 5 of the drawings, in which reference numbers equal or similar to those employed above for FIGS. 1 to 3 have been used to indicate parts equal or similar to them, a high-speed roll-up door indicated by reference 10*a* is shown, which is placed between two environments at different temperatures and provided with a device for draining the condensation water according to the invention. In particular, the elements of FIGS. 4 and 5 already described for a roll-up door of the prior art will generally not be described again.

Each of the side uprights 24 of the portal structure 18, in which a respective side edge of the curtain 16 is slidably mounted, includes a respective guide rail 26 which comprises an upper rectilinear portion 26*a*, substantially vertical and close to the shelter area 28, and a lower rectilinear portion 26*b* substantially vertical and offset with respect to the upper rectilinear portion 26*a*, the portions 26*a* and 26*b* being substantially parallel and spaced apart.

Between the rectilinear portions 26*a* and 26*b* extends an inclined guide rail portion indicated by 26*c*, having a general S-shape, being connected upstream with the respective upper rectilinear portion 26*a*, and downstream with the respective lower rectilinear portion 26*b*, by means of respective curved portions 26*d* and 26*e*. The inclined portion 26*c* forms an angle α between about 20° and 40°, preferably about 30°, with respect to the vertical of the upper rectilinear portion 26*a*, and of the lower rectilinear portion 26*b* which, as stated above, is substantially parallel to the upper portion 26*a*, so as not to significantly slow down the sliding speed of the curtain 16.

Below the upper rectilinear portion 26*a* of the rails 26 there is a gutter formation 34 made by means of a hollow section bar, for example of metal or plastic material, arranged substantially horizontal and having the concavity facing upwards to receive by gravity the condensation water coming from the surface of the curtain 16, in particular during its raising step towards the shelter area 28.

The gutter formation 34, which has a length at least equal to the width of the curtain 16, comprises a connection plate 34*a* which extends along one of its longitudinal sides to allow it to be fixed to the wall 14 facing the environment downstream with respect to the portal structure 18, by means of preferably removable fixing means 34*b*, such as nails or screws and relative anchors.

The gutter formation 34 is conveniently arranged in such a manner that the center of the concavity of the relevant section bar is positioned substantially on the vertical of the upper rectilinear portion 26*a* of the guide rails 26, as shown in FIG. 4, in order to effectively collect the condensation water coming from this upper portion 26*a*.

Preferably, at least one longitudinal end portion of the gutter formation 34 is associated with a downspout 36 for draining the condensation water collected by the curtain 16 to the ground.

As an alternative, and according to a modification not shown in the figures, the downpipe 36 can be made in such a way as to discharge the condensation water collected by the gutter formation 34, inside the lower rectilinear portion 26*b* of one or both of the drainage rails. guide 26.

In the operation of the device of the invention, the motorized shaft arranged inside the "roller shutter box" 30 is actuated to wind the curtain 16 of the roll-up door 10*a* in the shelter area 28, dragging it towards its raised condition starting from the lowered condition shown in FIG. 4, so as to open the passage 12 defined by the portal structure 18.

When on the surface of the curtain 16, in its lowered configuration closing the passage 12, there is condensation water, in particular on its surface facing the outer environment, this falls from the curtain 16 by gravity and accumulates on the gutter formation 34.

Although a small part of the condensation water present on the curtain 16 can descend in the direction identified by the lower rectilinear portion 26*b* of the rails 26 when the curtain 16 is in the lowered condition, the raising step of the curtain 16 is so rapid that practically the curtain 16 almost instantaneously moves to the raised condition shown in FIG. 5, in which the portion of the curtain 16 not wound on the winding shaft of the "roller shutter box" 30 is entirely above the gutter formation 34, whereby this condensation water falls by gravity into the gutter formation 34 (see FIG. 5).

The condensation water in the gutter formation 34 can be easily discharged to the ground through one or more downspouts 36 made up of pipes of plastic or metal material.

At the end of the winding step of the curtain 16 as well as in the subsequent step of its unwinding from the shelter area 28, when it is lowered to close the passage 12 defined by the portal structure 18, the curtain 16 remains completely dry, which allows to avoid its damage over time due to moisture, and therefore to extend its service life.

The invention claimed is:

1. A high speed sliding roll-up door configured to be interposed between two rooms at different temperatures, comprising a flexible curtain configured for closing or opening a passage formed between said rooms and delimited by a portal structure that includes a pair of opposite uprights each provided with a guide rail slidably engaged by a side edge of the curtain, and an upper crosspiece delimiting a shelter area above the portal structure in which said curtain is received in the open condition of said passage, said guide rails having upper rectilinear portions adjacent said shelter area, and lower rectilinear portions below said upper rectilinear portions and offset with respect to said upper rectilinear portions, both said upper and lower rectilinear portions being substantially vertical and between which S-shaped inclined portions are interposed and connected upstream and downstream with said upper and lower rectilinear portions by respective curved sections, wherein said roll-up door includes a condensation water draining device which comprises a gutter formation arranged below the curtain and the upper rectilinear portions of the guide rails to receive by gravity condensation water coming from a surface of said curtain during its raising step towards said shelter area, said gutter formation including a substantially horizontal hollow section bar having a concavity facing upwards, and having a length which is at least equal to a width of said curtain, the center of the concavity of the section bar of said gutter formation being positioned substantially on a vertical axis of said upper rectilinear portion of said guide rails of the curtain.

2. The high speed sliding roll-up door of claim 1, wherein said upper and lower rectilinear portions of the guide rails for the curtain are parallel and vertical.

3. The high speed sliding roll-up door of claim 1, wherein said inclined portion is inclined with respect to said upper and lower rectilinear portions by an angle of between about 20° and 40°.

4. The high speed sliding roll-up door of claim 1, wherein said inclined portion is inclined with respect to said upper and lower rectilinear portions by an angle of about 30°.

5. The high speed sliding roll-up door of claim 1, wherein said gutter formation includes a substantially horizontal hollow section bar having a concavity facing upwards, the length of which is at least equal to the width of said curtain.

6. The high speed sliding roll-up door of claim 5, wherein said gutter formation has a connection plate configured to be connected to said wall for separating said rooms, by removable fasteners.

7. The high speed sliding roll-up door of claim 1, further comprising at least one downspout configured for draining to the ground condensation water collected into said gutter formation.

8. The high speed sliding roll-up door of claim 7, wherein said downspout is configured to drain condensation water collected by said gutter formation inside said lower rectilinear portion of at least one guide rail.

* * * * *